United States Patent
Carrasco et al.

(10) Patent No.: US 11,767,487 B2
(45) Date of Patent: *Sep. 26, 2023

(54) INVERTING AIDS FOR LATEX-BASED DRAG REDUCING AGENTS

(71) Applicant: Baker Hughes Oilfield Operations LLC, Houston, TX (US)

(72) Inventors: Analette Carrasco, Sugar Land, TX (US); Joey Dacula Mangadlao, Agusan del Sur (PH)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 403 days.

This patent is subject to a terminal disclaimer.

(21) Appl. No.: 16/927,619

(22) Filed: Jul. 13, 2020

(65) Prior Publication Data

US 2022/0010229 A1    Jan. 13, 2022

(51) Int. Cl.
| | |
|---|---|
| *C10M 145/26* | (2006.01) |
| *C10M 173/02* | (2006.01) |
| *C10M 169/04* | (2006.01) |
| *C10G 71/00* | (2006.01) |
| *C10N 20/00* | (2006.01) |
| *C10N 50/00* | (2006.01) |

(52) U.S. Cl.
CPC ........... *C10M 145/26* (2013.01); *C10G 71/00* (2013.01); *C10M 169/041* (2013.01); *C10M 173/02* (2013.01); *C10M 2205/043* (2013.01); *C10M 2209/0845* (2013.01); *C10M 2209/0863* (2013.01); *C10M 2209/103* (2013.01); *C10M 2209/1033* (2013.01); *C10M 2217/0245* (2013.01); *C10N 2020/071* (2020.05); *C10N 2020/075* (2020.05); *C10N 2050/01* (2020.05)

(58) Field of Classification Search
CPC .... C10G 71/00; C09K 8/035; C09K 2208/28; C10M 169/041; C10M 173/02; C10M 145/26; C10M 2217/0245; C10M 2209/0845; C10M 2209/1033; C10M 2205/043; C10M 2209/103; C10M 2209/0863; C10N 2020/071; C10N 2050/01; C10N 2020/075
See application file for complete search history.

(56) References Cited

U.S. PATENT DOCUMENTS

| | | | |
|---|---|---|---|
| 5,733,953 | A | 3/1998 | Fairchild et al. |
| 6,126,872 | A | 10/2000 | Kommareddi et al. |
| 6,841,593 | B2 | 1/2005 | Kommareddi et al. |
| 6,894,088 | B2 | 5/2005 | Motier et al. |

(Continued)

FOREIGN PATENT DOCUMENTS

EP    0696631 A2    2/1996

*Primary Examiner* — Vishal V Vasisth
(74) *Attorney, Agent, or Firm* — Crowe & Dunlevy, P.C.

(57) ABSTRACT

An oxyalkylated branched aliphatic compound produced by oxyalkylating a branched aliphatic compound having 12 or more carbon atoms in which the branched aliphatic compound having 12 or more carbon atoms is grafted with a polyether via a crosslinking reaction, wherein the polyether is a polymer of ethylene oxide, propylene oxide, butylene oxide, and combinations thereof, may be useful as an inverting aid for increasing the dissolution rate of a latex-based drag reducing agent in a liquid hydrocarbon.

16 Claims, 1 Drawing Sheet

(56) References Cited

U.S. PATENT DOCUMENTS

| | | |
|---|---|---|
| 6,946,500 B2 | 9/2005 | Harris et al. |
| 7,285,582 B2 | 10/2007 | Harris et al. |
| 7,361,628 B2 | 4/2008 | Milligan et al. |
| 7,763,671 B2 | 7/2010 | Harris et al. |
| 7,842,738 B2 | 11/2010 | Milligan et al. |
| 7,884,144 B2 | 2/2011 | Smith et al. |
| 7,888,407 B2 | 2/2011 | Burden et al. |
| 7,939,584 B2 | 5/2011 | Harris et al. |
| 8,022,118 B2 | 9/2011 | Milligan et al. |
| 8,215,930 B2 | 7/2012 | Burden et al. |
| 8,426,498 B2 | 4/2013 | Milligan et al. |
| 8,450,249 B2 | 5/2013 | Milligan et al. |
| 8,450,250 B2 | 5/2013 | Milligan et al. |
| 8,450,251 B2 | 5/2013 | Milligan et al. |
| 8,616,236 B2 | 12/2013 | Burden |
| 8,656,950 B2 | 2/2014 | Burden |
| 8,916,626 B2 | 12/2014 | Milligan |
| 9,644,161 B2 | 5/2017 | Kommareddi et al. |
| 9,676,878 B2 | 6/2017 | Bao et al. |
| 9,783,644 B2 | 10/2017 | Burden et al. |
| 9,784,414 B2 | 10/2017 | Bao et al. |
| 9,951,151 B2 | 4/2018 | Bao et al. |
| 10,053,595 B2 | 8/2018 | Johnston et al. |
| 2006/0144595 A1 | 7/2006 | Milligan et al. |
| 2006/0148928 A1* | 7/2006 | Harris ............... F17D 1/17 523/175 |
| 2007/0100002 A1* | 5/2007 | Leinweber ......... C10G 33/04 516/135 |
| 2009/0209679 A1 | 8/2009 | Dreher et al. |
| 2014/0224495 A1* | 8/2014 | Khandekar ......... C09K 8/524 560/182 |
| 2015/0209738 A1 | 7/2015 | Kommareddi et al. |
| 2016/0281934 A1 | 9/2016 | Olechnowicz et al. |
| 2020/0040251 A1 | 2/2020 | Li et al. |

* cited by examiner

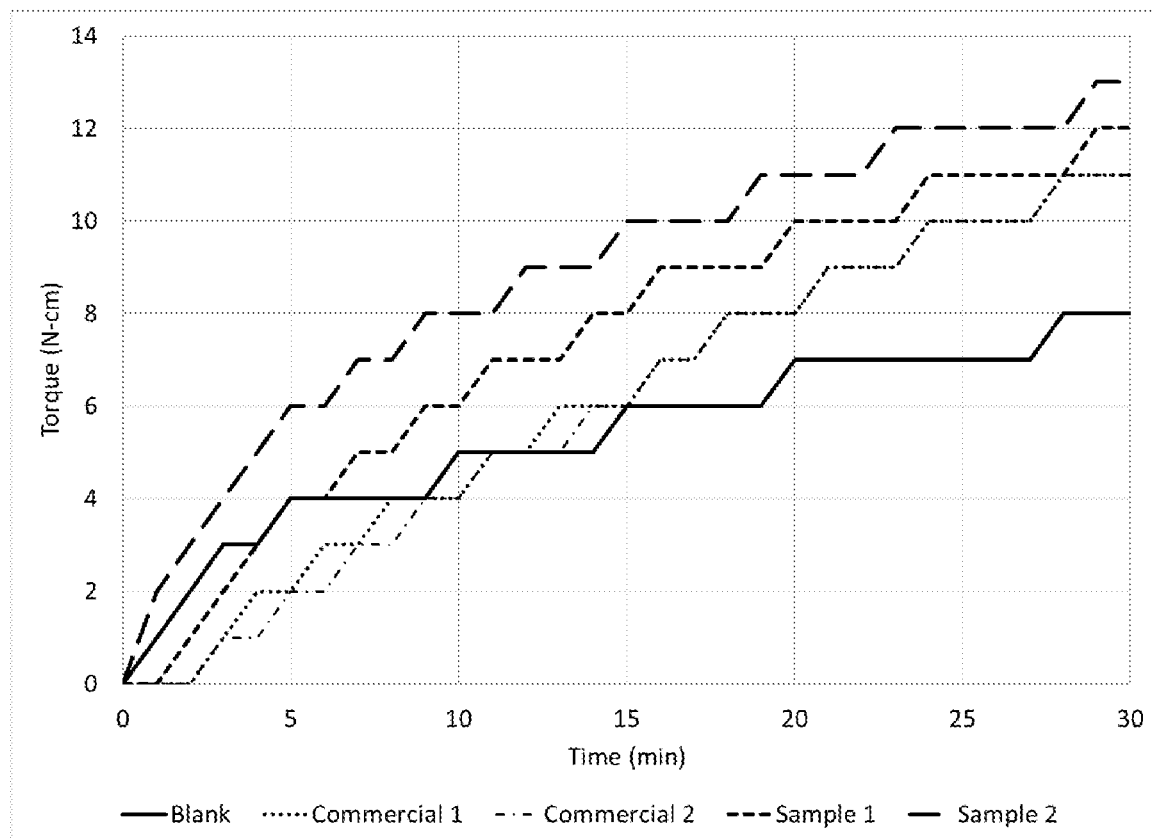

INVERTING AIDS FOR LATEX-BASED DRAG REDUCING AGENTS

TECHNICAL FIELD

The present invention relates to additives for enhancing the dissolution rate of latex-based drag reducing agents used in liquid hydrocarbon stream to improve flow during pumping or transport of the stream, and more particularly relates to applying an effective amount of an oxyalkylated branched aliphatic compound having 12 or more carbon atoms to increase the amount of polymers released from the latex-based drag reducing agent into the liquid hydrocarbon stream.

BACKGROUND

In the production and transport of oil and gas, drag reducing agents are additives that are introduced to liquid hydrocarbon streams, such as crude oil, to reduce the energy required for pumping by reducing drag and to improve pipeline flow.

Drag reducing agents ("DRAs") can take various forms, including certain polymers in the forms of latexes, oil-soluble suspensions, pellets, gels, microfine powders and particulate slurries.

Latex-based DRAs, which are colloidal dispersions of polymer droplets stabilized by emulsifying surfactants, are prone to a slow dissolution rate when applied crude oil, for example. To address this problem, latex-based DRAs are sometimes formulated with additives known as inverting aids. Inverting aids function as a dissolution rate enhancer by destabilizing the dispersion and allowing polymer to unfold and interact more efficiently to the hydrocarbon stream that is being pumped or transported.

Because of the considerable costs associated with the pumping and transporting of oil and gas streams, it is desirable that latex-based DRAs formulated with inverting aids to further enhance the dissolution rate of the polymer into the hydrocarbon stream being transported in a cost-efficient manner.

SUMMARY

There is provided, in one non-limiting form, a method for enhancing the dissolution rate of a latex-based drag reducing agent ("DRA") in a liquid hydrocarbon stream in which an oxyalkylated branched aliphatic compound having 12 or more carbon atoms is admixed with a latex-based drag reducing agent in the liquid hydrocarbon stream in an amount effective to increase the dissolution rate of the latex-based drag reducing agent into the liquid hydrocarbon stream, wherein, in one non-exclusive embodiment, the effective amount of oxyalkylated branched aliphatic compound ranges from 0.1 wt. % to about 50 wt. %, based on total weight of oxyalkylated branched aliphatic compound and the latex-based drag reducing agent.

There is further provided in another non-limiting form, an inverting aid-enhanced latex-based DRA formulation made up of about 0.1 wt. % to about 10 wt. % of an oxyalkylated branched aliphatic compound having 12 or more carbons and the remainder being made up of a latex-based DRA.

In yet another non-limiting form, there is provided a liquid hydrocarbon stream treated with a latex-based DRA and 0.1 wt. % to 50 wt. % of an oxyalkylated branched aliphatic compound having 12 or more carbons.

In one non-restrictive embodiment, the oxyalkylated branched aliphatic compound is formed by oxyalkylating the branched aliphatic compound having 12 or more carbon atoms in which the branched aliphatic compound having 12 or more carbon atoms is grafted with a polyether via a crosslinking reaction, wherein the polyether is a polymer of ethylene oxide, propylene oxide, butylene oxide, and combinations thereof.

BRIEF DESCRIPTION OF THE DRAWINGS

FIG. 1 is a graphic illustration comparing torque as a function of the dissolution time of a latex-based DRA without any inverting aids to torque as a function of the dissolution time of the same latex-based DRA containing commercial low HLB surfactant inverting aids and the same latex-based DRA containing oxyalkylated branched aliphatic inverting aid of the kind disclosed herein.

DETAILED DESCRIPTION

It has been discovered that an inverting aid in the form of an oxyalkylated branched aliphatic compound having 12 or more carbon atoms may be applied to or admixed with latex-based drag reducing agents ("DRA") in a liquid hydrocarbon stream, the kinds that are typically added or introduced to liquid hydrocarbon streams, such as crude oil, to reduce the energy required for pumping by reducing drag and to improve pipeline flow, in order to increase or enhance the dissolution rate of polymer(s) making up the latex-based DRA in the liquid hydrocarbon stream.

The latex-based DRAs that are commonly introduced to liquid hydrocarbon streams, include, but are not limited to, polymers of acrylate, methacrylate, acrylamide, methacrylamide, vinyl formamides, styrenic olefin maleic esters; aliphatic olefin maleic imides; polyol-based polymers; acrylate-based polymers; methacrylate-based polymers; maleate-based polymers; and combinations thereof.

As discussed above, such latex-based DRAs are prone to a slow dissolution rate when applied to crude oil, for example. To address this problem, latex-based DRAs may be applied to the liquid hydrocarbon stream with additives known as inverting aids. Inverting aids function as a dissolution rate enhancer by destabilizing the dispersion and allowing polymer of the latex-based DRA to unfold and interact more efficiently to the liquid hydrocarbon stream.

Oxyalkylated branched aliphatic compounds have been discovered to be effective in increasing or enhancing the dissolution rate latex-based DRAs in the liquid hydrocarbon stream.

In a non-limiting embodiment, the backbone of the oxyalkylated branched aliphatic compound agent comprises a branched aliphatic compound having 12 or more carbon atoms. The branches of the aliphatic chain may be composed functional groups made up of 2 to 28 carbon atoms each. The branches may have different carbon numbers from each other. Examples of such functional groups include, but are not limited to, alkyl groups having 2 to 28 carbon atoms, arylalkyl groups having 2 to 28 carbon atoms, cycloalkyl groups having 2 to 28 carbon atoms, and combinations thereof. The long-chain branched aliphatic compound may additionally, or in the alternative, comprise branches having functional groups selected from the group consisting of oxygen functional groups, nitrogen functional groups, sulfur functional groups, phosphorous functional groups, and combinations thereof. In one non-restrictive embodiment, the branched aliphatic compound may be crosslinked with one or more other branched aliphatic compound to give a dendrimer or hyperbranched aliphatic compound. It is appreciated by one of ordinary skill in the art that a hyperbranched aliphatic may have a random or defined hierarchical structure. A dendrimer may be considered to be a hyperbranched aliphatic compound with a defined hierarchical structure.

The oxyalkylated branched aliphatic compound agent is produced by oxyalkylating the branched aliphatic compound having 12 or more carbon atoms, which involves grafting the branched aliphatic compound having 12 or more carbon atoms with a polyether. The polyethers that may be grafted upon the long chain branched aliphatic compound include, without limitation, polymers of ethylene oxide ("EO"), polymers of propylene oxide ("PO"), polymers of butylene oxide, and combinations thereof. These polymers may be polymers of only one monomer, random copolymers, block copolymers, gradient copolymers, or combinations thereof. The polyether-grafted branched aliphatic compound may be formed through a reaction involving an epoxide opening to achieve the desired architecture. The crosslinking reaction may be base-catalyzed, acid-catalyzed, or uncatalyzed. The crosslinkers useful in forming the polyether-grafted branched aliphatic compound may include one or more of the following: an epoxide, an isocyanate, a carboxylic acid, an acyl halide, an aldehyde, a nitrile, a halide, an ester, an anhydride, an alcohol, an amine, and an amide.

In another non-limiting embodiment, the oxyalkylated branched aliphatic compound agent having 12 or more carbon atoms that is formed by the oxyalkylating reaction described in the previous paragraph may be post-functionalized with a sulfate, sulfonate, phosphate, phosphonate, and/or other such charged species.

Examples of liquid hydrocarbon streams that may be treated with the latex-based DRAs and inverting aids of the kinds disclosed herein include, but are not limited to, crude oil, heavy oil, gasoline, diesel fuel, fuel oil, naphtha, asphalt, a production fluid, and combinations thereof.

The oxyalkylated branched aliphatic inverting aid compound having 12 or more carbon atoms may be combined with, applied to, mixed with, admixed with, or introduced to the latex-based DRA before being introduced to the liquid hydrocarbon stream or may be combined with, applied to, mixed with, admixed with, or introduced to the liquid hydrocarbon stream separately from the latex-based DRA to enhance the dissolution rate of the latex-based DRA. Depending on when the inverting aid is introduced, admixed, applied, combined, or mixed, the oxyalkylated branched aliphatic compound inverting aid having 12 or more carbon atoms may be present in an amount ranging from about 0.1 wt. % independently to about 50 wt. %, alternatively from about 1 wt. % independently to about 20 wt. %, or from about 5 wt. % independently to about 10 wt. %, based on total weight of oxyalkylated branched aliphatic compound and latex-based DRA. These amounts have been shown to be effective in improving the dissolution of the latex-based DRAs in the liquid hydrocarbon stream. As used herein with respect to a range, "independently" means that any threshold given may be used together with any other threshold given to provide a suitable alternative range.

A goal of the combining the inverting aids of the kinds disclosed herein with latex-based DRAs and the liquid hydrocarbon streams is to effectively increase or enhance the dissolution rate of the latex-based DRA in the liquid hydrocarbon stream. For purposes of this disclosure, the terms "increase" and "enhance" are used synonymously and are both defined to mean "make the rate higher."

In another non-limiting embodiment, other additives and mixtures thereof may be added to the oxyalkylated branched aliphatic compound having 12 or more carbons including, but not necessarily limited to, coagulants, flocculants, corrosion inhibitors, viscosity reducers and other chemical treatments used in crude oil production, refining and chemical processing. Several additional chemicals such as friction reducers, scale inhibitors, paraffin inhibitors, pour point depressants, asphaltene inhibitors, clay swelling inhibitors, biocides, antifoulants, flow back aids and surfactants may be added during treatment with the composition of the present innovation.

The invention will be further described with respect to the following Examples, which are not meant to limit the invention, but rather to further illustrate some embodiments.

EXAMPLES

Example 1

Samples of latex-based DRA treated crude oil containing no inverting aids and containing inverting aids were prepared and mixed using an overhead stirrer with torque measuring capability to evaluate and compare the dissolution rate of the latex-based DRA in the crude oil. FIG. 1 is graphic illustration showing the torque achieved as a function of time of each sample tested. In this evaluation, torque was measured every 30 minutes. The Blank sample is a sample of crude oil containing a latex-based DRA but no inverting aids. Commercial 1 and Commercial 2 were samples of crude oil containing 50 wt. % latex-based DRA and 50 wt. % of commercial low HLB surfactants, sorbitan sesquioleate and sorbitan monooleate, respectively. Sample 1 was a sample of crude oil containing 50 wt. % of a crosslinked oxyalkylated C28 branched aliphatic of the kinds disclosed herein and 50 wt. % of a latex-based DRA. Sample 2 was a sample of crude oil containing 50 wt. % of a crosslinked oxyalkylated C24 branched aliphatic of the kinds disclosed herein and 50 wt. % of a latex-based DRA.

As reflected in the graph in FIG. 1, the samples containing an oxyalkylated branched aliphatic compound inverting aid exhibited a significant reduction in dissolution time as compared to the Blank sample and the samples containing the commercial low HLB surfactant inverting aid, which indicates a much higher amount of polymers were released into the crude oil with the addition of the polyether grafted branched aliphatic compounds.

Example 2

The same torque tests were run on another set of crude oil samples. In this test, a Blank crude oil sample containing only a latex-based DRA was compared to samples containing 50 wt. % latex DRA and 50 wt. % polyether grafted branched aliphatic compound inverting aids. Sample 2A and 2B are examples of oxyalkylated crosslinked C24 branched aliphatic compounds.

The results of these tests, which are shown in Table 1, also indicate that the use of the polyether grafted branched aliphatic compound inverting aids significantly reduced dissolution time of the latex-based DRA.

TABLE 1

Comparison of Dissolution Time of Latex-based DRAs in Blank Crude Oil Samples and Crude Oil Samples containing Polyether Grafted Branched Aliphatic Compound Inverting Aids.

| Sample | Sample Time to Reach Max Torque of Blank (min) |
|---|---|
| Blank | 28 |
| Sample 2A - 50 wt % based on DRA | 9 |
| Sample 2B - 25 wt % based on DRA | 13 |

In the foregoing specification, the invention has been described with reference to specific embodiments thereof. However, it will be evident that various modifications and changes can be made thereto without departing from the broader spirit or scope of the invention as set forth in the appended claims. Accordingly, the specification is to be regarded in an illustrative rather than a restrictive sense. For example, oxyalkylated branched aliphatic compounds, crosslinkers, reactions, latex-based agents, liquid hydrocarbon streams, formulations, amounts, and methods not specifically identified or described in this disclosure or not evaluated in a particular Example are still expected to be within the scope of this invention.

The present invention may suitably comprise, consist or consist essentially of the elements disclosed and may be practiced in the absence of an element not disclosed. For instance, the method or formulation may comprise, consist essentially of, or consist of the steps or components recited in the independent claims, respectively. In a non-limiting example, in the method for enhancing the dissolution rate of a latex-based drag reducing agent in a liquid hydrocarbon stream, the method may consist essentially of or consist of admixing an oxyalkylated branched aliphatic compound having 12 or more carbon atoms with the latex-based drag reducing agent in the liquid hydrocarbon stream in an amount effective to increase the dissolution rate of the latex-based drag reducing agent into the liquid hydrocarbon stream. In another non-limiting example there is provided an inverting aid-enhanced latex-based drag reducing agent formulation, the formulation consisting essentially of or consisting of an oxyalkylated branched aliphatic compound having 12 or more carbons; and a latex-based drag reducing agent; where the oxyalkylated branched aliphatic compound is present in an amount ranging from 0.1 wt. % to about 10 wt. %, based on total weight of oxyalkylated branched aliphatic compound and the latex-based drag reducing agent. Furthermore, in another non-restrictive version there may be provided a treated hydrocarbon stream consisting essentially of or consisting of a liquid hydrocarbon stream, an oxyalkylated branched aliphatic compound having 12 or more carbons, and a latex-based drag reducing agent.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A method for enhancing the dissolution rate of a latex-based drag reducing agent in a liquid hydrocarbon stream, the method comprising:
   providing a branched aliphatic compound having a chain of 12 or more carbon atoms, wherein the branched aliphatic compound comprises branches, each branch comprising a functional group selected from the group consisting of alkyl groups, arylalkyl groups, cycloalkyl groups, and combinations thereof, wherein the functional group has 2 to 28 carbons;
   oxyalkylating the branched aliphatic compound to form an oxyalkylated branched aliphatic compound having 12 or more carbon atoms;
   admixing the oxyalkylated branched aliphatic compound with the latex-based drag reducing agent in the liquid hydrocarbon stream in an amount effective to increase the dissolution rate of the latex-based drag reducing agent into the liquid hydrocarbon stream; and
   increasing the dissolution rate of the latex-based drag reducing agent in the liquid hydrocarbon stream.

2. The method of claim 1, wherein the branched aliphatic compound having 12 or more carbon atoms is crosslinked to another branched aliphatic compound to form dendrimers.

3. The method of claim 2, wherein the dendrimers are hyperbranched aliphatic compound.

4. The method of claim 1, wherein the branches further comprise functional groups selected from the group consisting of oxygen functional groups, nitrogen functional groups, sulfur functional groups, phosphorous functional groups, and combinations thereof.

5. The method of claim 1, wherein the branched aliphatic compound having 12 or more carbon atoms is grafted with a polyether via a ring-opening reaction.

6. The method of claim 5, wherein the polyether is selected from a group consisting of a polymer of ethylene oxide, a polymer of propylene oxide, a polymer of butylene oxide, and combinations thereof.

7. The method of claim 1, wherein the latex-based drag reducing agent is selected from a group consisting of polymers of acrylates, methacrylates, acrylamide, methacrylamides, vinyl formamides, styrenic-based polymers and combinations thereof; olefin maleic esters; aliphatic olefin maleic imides; polyol-based polymers; acrylate-based polymers; methacrylate-based polymers; maleate-based polymers; and combinations thereof.

8. The method of claim 1, wherein:
   the liquid hydrocarbon is crude oil, and
   the effective amount of oxyalkylated branched aliphatic compound ranges from 0.1 wt. % to about 50 wt. %, based on total weight of oxyalkylated branched aliphatic compound and the latex-based drag reducing agent.

9. An inverting aid-enhanced latex-based drag reducing agent formulation, the formulation comprising:
   an oxyalkylated branched aliphatic compound having a chain of 12 or more carbons and comprising branches, wherein each of the branches comprises a functional group selected from the group consisting of alkyl groups having 2 to 28 carbon atoms, arylalkyl groups having 2 to 28 carbon atoms, cycloalkyl groups having 2 to 28 carbon atoms, and combinations thereof; and
   a latex-based drag reducing agent;
   where the oxyalkylated branched aliphatic compound is present in an amount ranging from 0.1 wt. % to about 10 wt. %, based on total weight of oxyalkylated branched aliphatic compound and the latex-based drag reducing agent.

10. The formulation of claim 9, wherein the oxyalkylated branched aliphatic compound is formed by oxyalkylating a branched aliphatic compound having 12 or more carbon atoms.

11. The formulation of claim 9, wherein the branches of the oxyalkylated branched aliphatic compound further comprise functional groups selected from the group consisting of oxygen functional groups, nitrogen functional groups, sulfur functional groups, phosphorous functional groups, and combinations thereof.

12. The formulation of claim 10, wherein the branched aliphatic compound having 12 or more carbon atoms is grafted with a polyether via a crosslinking-reaction.

13. The formulation of claim 12, wherein the polyether is selected from a group consisting of a polymer of ethylene oxide, a polymer of propylene oxide, a polymer of butylene oxide, and combinations thereof.

14. The formulation of claim 9, wherein the latex-based drag reducing agent is selected from a group consisting of polymers of acrylates, methacrylates, acrylamide, methacrylamides, vinyl formamides, styrenic-based polymers and combinations thereof; olefin maleic esters; aliphatic olefin maleic imides; polyol-based polymers; acrylate-based polymers; methacrylate-based polymers; maleate-based polymers; and combinations thereof.

15. A treated hydrocarbon stream comprising:
a liquid hydrocarbon stream;
an oxyalkylated branched aliphatic compound having a chain of 12 or more carbons and comprising branches, wherein each of the branches comprises a functional group selected from the group consisting of alkyl groups having 2 to 28 carbon atoms, arylalkyl groups having 2 to 28 carbon atoms, cycloalkyl groups having 2 to 28 carbon atoms, and combinations thereof; and
a latex-based drag reducing agent;
wherein the oxyalkylated branched aliphatic compound is present in an amount effective to increase the dissolution rate of the latex-based drag reducing agent in the liquid hydrocarbon stream, the amount ranging from 0.1 wt. % to about 50 wt. %, based on total weight of oxyalkylated branched aliphatic compound and the latex-based drag reducing agent.

16. The treated hydrocarbon stream of claim 15, wherein the liquid hydrocarbon stream is crude oil.

* * * * *